INVENTORS.
EVERETT C. HUGHES
HAROLD A. STRECKER

INVENTORS.
EVERETT C. HUGHES
HAROLD A. STRECKER
BY
ATTORNEYS 2,783,134
Patented Feb. 26, 1957

2,783,134
PROCESS FOR THE PRODUCTION OF OXYGEN

Everett C. Hughes, Shaker Heights, and Harold A. Strecker, Bedford, Ohio, assignors to The Standard Oil Company, Cleveland, Ohio, a corporation of Ohio Application July 3, 1953, Serial No. 365,976

2 Claims. (Cl. 23—221)

The present invention relates to a process for the production of oxygen. More particularly, the invention relates to a cyclic process for producing oxygen by employing an oxide of chromium as an oxygen carrier.

The production of oxygen by a so-called "oxygen carrier" technique is known to the art. An example of such a process is the Brin process which is discussed in Thorp, Outlines of Industrial Chemistry, pp. 275–276, 3rd edition (1916). The Brin process utilizes barium peroxide as a carrier of oxygen, and in the process $BaO_2$ is reduced under a vacuum of about 26–28 inches of mercury and the oxygen which is evolved is recovered. The reduced barium peroxide is then regenerated in a current of air at temperatures in excess of 1200° F. A severe limitation on the Brin process is that moisture and impurities must be removed from the regenerating gas in order to prevent formation of stable barium hydroxide and barium carbonate.

It is also known that chromium trioxide ($CrO_3$) can be reduced by heat to trivalent chromic oxide ($Cr_2O_3$) with the evolution of oxygen as a product of the reaction. The chemical decomposition of unsupported chromium trioxide may be illustrated by the following equation:

$$4CrO_3 \underset{1020° F.}{\overset{2190° F.}{\rightleftarrows}} 2Cr_2O_3 + 3O_2$$

Of the two valence states of chromium represented in the formula, the trivalent chromic oxide is thermodynamically stable at temperatures below about 1000° F. The hexavalent chromium trioxide decomposes quantitatively to trivalent chromic oxide at about 1020° F. but the reverse reaction does not take place below 2190° F. From the equation, it is apparent that unsupported chromium trioxide is not readily adaptable as an oxygen carrier for the production of oxygen because excessively high temperatures would be required for regeneration.

It is an object of this invention to provide a process for the production of oxygen which does not require temperatures as high as those required in the Brin process and which does not require the removal of moisture and impurities from the regenerating gas.

The above object and others are achieved by a process utilizing an oxide of chromium supported on silica gel as an oxygen carrier. In essence, the process comprises heating, in the substantial absence of oxygen, an oxygen carrier composed of chromium trioxide supported on silica gel to reduce the chromium trioxide and evolve oxygen, removing the evolved oxygen, and heating the reduced oxide of chromium in the presence of an oxygen-containing gas such as air to regenerate chromium trioxide.

In accordance with the present invention, it has been found that if chromium trioxide is supported on silica gel, the thermal stability of the trioxide is increased to such an extent that the chromium can easily be reduced to an intermediate valence state less stable than trivalent chromium. The meta-stable system that results from supporting chromium trioxide on silica gel can be represented by the following equation:

$$6CrO_3 \underset{500-800° F.}{\overset{600-800° F.}{\rightleftarrows}} 2Cr_2O_3 \cdot CrO_3 + 3O_2$$

While the precise structure of the reduced oxide on the right-hand side of the equation is not known, the average valence of four, as indicated by the formula, has been determined. From the equation it is apparent that only relatively low temperatures are required in both the reduction and oxidation steps. The extent to which the reaction will proceed in either direction is largely dependent upon the concentration of oxygen in the surrounding atmosphere. Thus, in accordance with the general laws of chemistry, a high concentration of oxygen will shift the equilibrium toward the left in the above equation whereas, if the concentration of oxygen is low, the equilibrium will shift toward the right.

The successful operation of the process of this invention is subject to criticalities in the temperatures employed for reduction and regeneration and in the amount of chromium trioxide relative to silica gel support. The temperature employed in the reduction step is perhaps the least critical but it should be within the approximate range of 500 to 800° F. Temperatures below this range do not provide a satisfactory yield of oxygen and temperatures above the range lead to an undesirable amount of decomposition to the difficultly oxidizable chromic oxide ($Cr_2O_3$).

The temperatures of regeneration must be within the approximate range of 600 to 800° F. The percent regeneration at temperatures below 600° F. is too low for satisfactory operation, and above 800° F. irreversible decomposition of the intermediate oxides to chromic oxide ($Cr_2O_3$) results at an increasing rate. Optimum regeneration is obtained within the range of 700 to 750° F. The time of regeneration can be materially decreased by application of superatmospheric pressure but the regeneration will proceed satisfactorily at atmospheric pressure.

The amount of chromium trioxide deposited on the silica gel should be limited to 25% by weight because concentrations greater than 25% lead to poor yields in regeneration due to irreversible decomposition of the chromium trioxide. The concentration of chromium trioxide may, however, be as low as desired without encountering irreversible decomposition.

The oxygen carriers employed in the practice of this invention may be produced in accordance with procedures well known in the art. The preferred procedure involves the impregnation of silica gel with a solution of a chromium compound followed by evaporation of the solvent to yield a dry solid and thereafter converting the chromium compound to the oxide by heating in air. Alternatively, the silica gel may be impregnated directly with a solution of chromium trioxide in which case conversion to the oxide form is unnecessary.

This invention and the advantages thereof will be described in connection with the attached drawings wherein.

Figure 1:
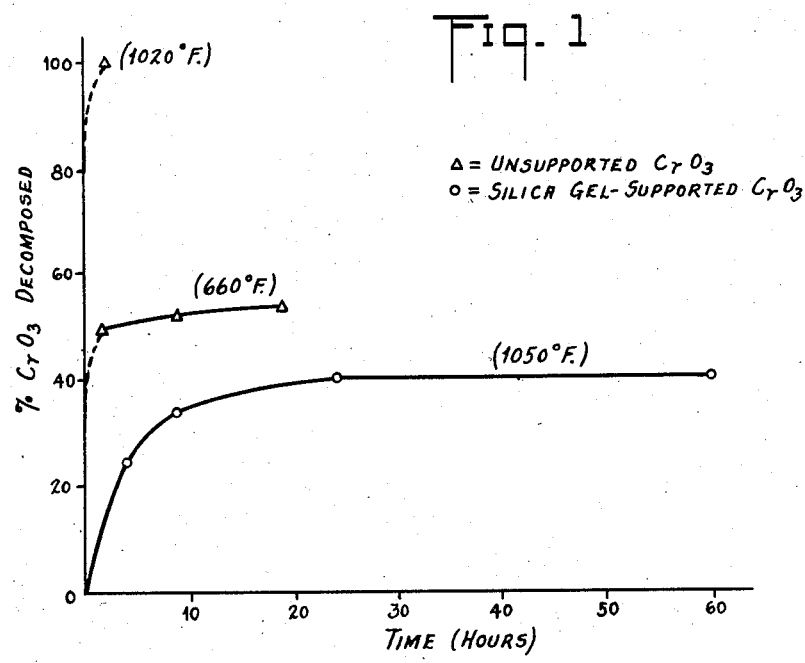
Figure 1 is a graph comparing the percent decomposition into chromic oxide ($Cr_2O_3$) of unsupported chromium trioxide and silica gel-supported chromium trioxide, when heated at atmospheric pressure.

The data for the decomposition curve on unsupported chromium trioxide for Figure 1 was obtained from the literature, Nargund and Watson, J. Ind. Inst. Sci., 9A, 149 (1926). The data for the decomposition curve on silica gel-supported chromium trioxide for Figure 1 was determined experimentally. It can be observed from Figure 1 that unsupported chromium trioxide readily decomposes to chromic oxide ($Cr_2O_3$) even at temperatures as low as 660° F. On the other hand, silica gel-supported chromium trioxide is relatively stable as regards decomposition to chromic oxide ($Cr_2O_3$). At 1050° F. the decomposition of the supported oxide is less than the decomposition of the unsupported oxide at 660° F., and at lower temperatures than 1050° F. the decomposition of the supported oxide is almost negligible.

Figure 2:
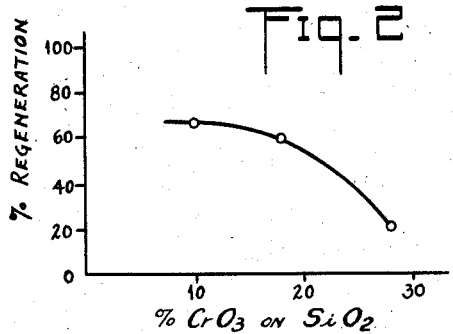
Figure 2 is a graph on which is plotted percent regeneration vs. the percentage of chromium trioxide in the oxygen carrier.

The data for Figure 2 was obtained by blowing air at a temperature of 800° F. for one hour through beds of reduced silica gel-supported chromium oxide containing various weight percentages of chromium oxide. It can be observed from Figure 2 that the percent regeneration begins to drop sharply as the concentration exceeds 20% and that about 25% by weight is the upper limit for reasonably efficient operation. Lower concentrations of oxide are not harmful but, for practical reasons, it is desirable to employ as high a percentage of oxide as possible without exceeding 25% by weight. A lower limit of about 10% by weight of the oxide is suggested.

Figure 3:
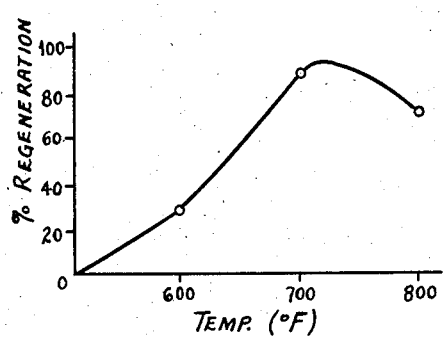
Figure 3 is a graph on which is plotted percent regeneration vs. temperature employed in the regeneration at atmospheric pressure of a silica gel-supported chromium oxide obtained by reduction of chromium trioxide supported on silica gel.

The curve of Figure 3 was obtained by blowing air at various temperatures through beds of a silica gel-supported chromium oxide obtained by the reduction of silica-gel-supported chromium trioxide. The ratio of chromium oxide to silica gel was approximately 1 to 9 and the regeneration was carried out in each instance for a period of one hour. From the graph it is apparent that maximum regenerating efficiency is obtained in the range of about 700 to 750° F. When the temperature of regeneration exceeds 800° F. there occurs irreversible decomposition of the intermediate oxides to chromic oxide at an increasing rate, and therefore 800° F. represents a fairly critical upper limit for the regeneration temperature. As the temperature of regeneration falls below 700° F., the efficiency of regeneration drops sharply, and at 600° F. the percent regeneration is approximately 30%. Therefore, 600° represents the approximate minimum temperature of regeneration which can be employed at atmospheric pressure to obtain a satisfactory efficiency in the regeneration step.

Figure 3 further reveals that a maximum regeneration of almost 85% can be achieved by blowing heated air at atmospheric pressure through the oxygen carrier. Other tests have shown that the same approximate level of regeneration can be achieved through several cycles and the maximum number of cycles through which the oxygen carrier will remain effective appears to be extremely large.

Figure 4:
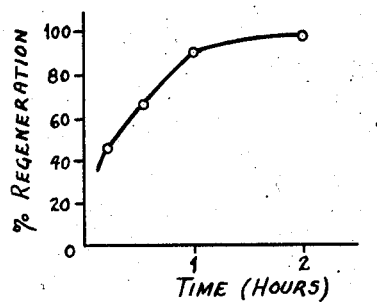
Figure 4 is a graph on which is plotted percent regeneration vs. time in hours for the regeneration of a silica gel-supported chromium oxide at atmospheric pressure.

The experiments on which the curve of Figure 4 is based were performed by blowing air for different periods of time through beds of a silica gel-supported chromium oxide which was obtained by the reduction of silica gel-supported chromium trioxide in which the ratio of silica gel to chromium trioxide was 8 to 2. The temperature of regeneration in each experiment was 750° F. From the curve of Figure 4 it is apparent that maximum efficiency of regeneration is approached after a period of one hour and that little benefit is realized by regeneration times longer than one hour, although longer times are not harmful and may be used if desired. The shortest regeneration period which can be employed to give a practicable operation of the process at atmospheric pressure is in the neighborhood of ten minutes.

Figure 5:
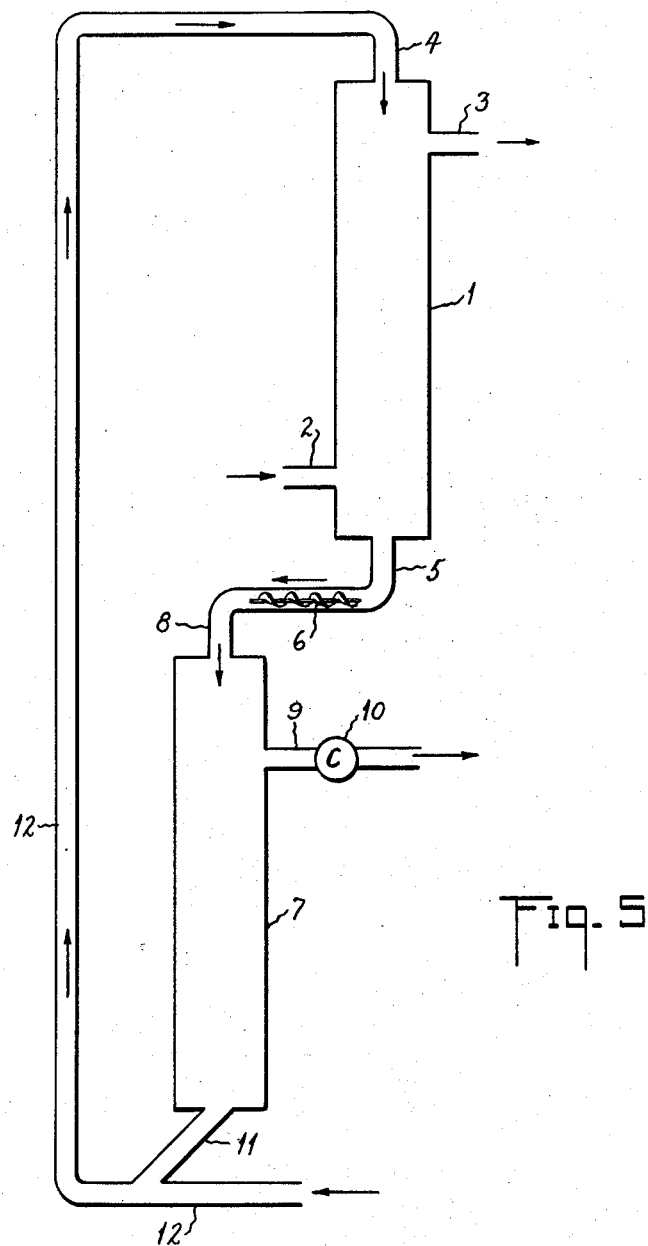
Figure 5 is a schematic flow sheet illustrating a continuous operation of the process of this invention.

Referring specifically to Figure 5, 1 represents a regeneration column having an air inlet 2 located near the bottom thereof, an air outlet 3 located near the top of the column, a solids inlet 4 located at the top of the column, and a solids outlet 5 located at the bottom of the column. The solids outlet 5 is connected with screw conveyor 6 which leads to a solids inlet 8 of oxidation column 7. The oxidation column 7 is provided with a gas outlet 9 which leads to compressor 10. The bottom of the column is provided with a solids outlet 11. The solids outlet 11 in turn joins with a pneumatic conveyor 12 which leads back to solids inlet 4 of the regeneration column.

In the operation of the process with reference to Figure 5, a quantity of an oxygen carrier comprising chromium trioxide supported on silica gel is charged into the regeneration column 1. Hot air at a temperature of about 600 to 800° F. is then introduced into the regeneration column 1 through air inlet 2 and is allowed to flow through the bed of solids in the regeneration column 1, leaving the column through air outlet 3. When the oxygen carrier in the regeneration column 1 has reached a temperature of at least 500° F., the screw conveyor 6 is started which results in a transfer of the oxygen carrier from the regeneration column 1 through solids outlet 5 and into the oxidation column through solids inlet 8. The screw conveyor 6 is preferably airtight to prevent leakage of air from regeneration column 1 into the oxidation column 7. The compressor 10 is run so that its inlet pressure is low enough to maintain a slight degree of vacuum within the oxidation column 7. As the oxygen carrier enters the oxidation column at a temperature of at least 500° F. and in the substantial absence of oxygen, the chromium trioxide proceeds to decompose and evolve oxygen which is withdrawn through outlet 9 to compressor 10 and thence to cylinder storage. The reduced solid, now composed of a silica gel-supported chromium oxide having an average valence of 4, collects in the bottom of the oxidation column 7 and is withdrawn therefrom by the action of pneumatic conveyor 12 and is returned to the solids inlet 4 of the regeneration column. As the reduced oxide enters the regeneration column, it is oxidized to chromium trioxide by the hot air and the cycle starts anew.

While at the outset of the operation according to the foregoing description the yield of oxygen may be fairly low, after the various pieces of equipment have reached the elevated temperatures of operation the yield of oxygen increases and the process may be operated continuously in the manner described. The oxygen that is evolved is of substantial purity, being contaminated only by relatively small percentages of other gases, primarily nitrogen, which is a result of the transfer of small quantities of air from the regeneration column to the oxidation column. The oxygen that is collected, however, is pure enough to be used for such purposes as supplying oxygen for pilots in high altitude flying or as a reactant in various chemical reactions.

In order to further illustrate the process and its accompanying advantages, the following example is given. Parts are by weight unless otherwise specified.

*Example 1*

Forty-five parts of a commercial silica gel was added to an aqueous solution of 5 parts by weight of chromium trioxide in 50 parts by weight of water. The resulting mixture was dried for several hours in an oven at 290° F. to yield a granular solid material.

The dry solid obtained by the above procedure was placed in a vessel having a tubular inlet at the bottom thereof and a tubular outlet (containing a filter) at the top thereof. The outlet of the vessel was provided with means for discharging to the atmosphere and was also connected with a compressor leading to a storage tank. Hot air was blown through the solid in the vessel until the temperature of the supported oxide was raised to about 800° F., at which point the oxide was reduced to the form $Cr_2O_3 \cdot CrO_3$. At this point the supply of air was stopped and the inlet was closed. The outlet to the atmosphere was also closed and the compressor was started to draw a slight vacuum in the vessel. The gas evolved from the vessel was collected in the storage tank. The total weight of gas collected was about 0.5 part, analyzing about 90% oxygen.

*Example 2*

A solution of 20 g. of $CrO_3$ in 100 ml. of water was mixed with 80 g. of a commercial silica gel. The water was then evaporated slowly by heating the mixture to 248° F. with frequent stirring. The oxygen carrier was then heated at 600° F. for 2½ hours under static conditions and was afterwards flushed with nitrogen for 30 minutes. The carrier was then employed in the process of Example 1 and a yield of 2.7 g. of a gas consisting predominantly of oxygen was obtained.

It will be obvious from the foregoing description that many modifications may be made in the invention without departing from the spirit of the invention.

We claim:

1. A process for the production of oxygen which comprises heating to a temperature within the range from about 500 to about 800° F., in the substantial absence of oxygen, an oxygen carrier comprising a preformed silica gel impregnated with chromium trioxide, the amount of chromium trioxide not exceeding about 25% by weight of the oxygen carrier, thereby reducing the chromium trioxide to a lower oxide down to but not including chromic oxide and evolving oxygen therefrom; removing the oxygen gas thus evolved; and reoxidizing the reduced chromium oxide to chromium trioxide by heating in the presence of an oxygen-containing gas at a temperature of from about 600 to 800° F.

2. A process according to claim 1 in which the process is operated continuously, alternately reducing and reoxidizing, the reoxidizing being at a temperature within the range from about 700 to about 750° F.

References Cited in the file of this patent

UNITED STATES PATENTS

| | | |
|---|---|---|
| 2,339,349 | Morey | Jan. 18, 1944 |
| 2,375,402 | Corson | May 8, 1945 |
| 2,381,825 | Lee | Aug. 7, 1945 |
| 2,461,838 | Neuhart | Feb. 15, 1949 |
| 2,490,986 | Symonds | Dec. 13, 1949 |
| 2,642,340 | Martin | June 16, 1953 |